US012767796B2

(12) United States Patent
Perez Valencia et al.

(10) Patent No.: US 12,767,796 B2
(45) Date of Patent: Oct. 20, 2026

(54) MULTIMODAL POLYETHYLENE

(71) Applicant: SABIC GLOBAL TECHNOLOGIES B.V., Bergen op Zoom (NL)

(72) Inventors: Francisco Perez Valencia, Geleen (NL); Mark Johannes Boerakker, Eindhoven (NL); Shaneesh Vadake Kulangara, Veldhoven (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 376 days.

(21) Appl. No.: 18/569,892

(22) PCT Filed: Jun. 14, 2022

(86) PCT No.: PCT/EP2022/066078
§ 371 (c)(1),
(2) Date: Dec. 13, 2023

(87) PCT Pub. No.: WO2022/263397
PCT Pub. Date: Dec. 22, 2022

(65) Prior Publication Data

US 2024/0279447 A1 Aug. 22, 2024

(30) Foreign Application Priority Data

Jun. 15, 2021 (EP) .................................... 21179500

(51) Int. Cl.

| | |
|---|---|
| ***C08L 23/06*** | (2006.01) |
| ***C08F 2/18*** | (2006.01) |
| ***C08F 4/02*** | (2006.01) |
| ***C08F 210/16*** | (2006.01) |
| ***C08L 23/0807*** | (2025.01) |

(52) U.S. Cl.
CPC ................ *C08L 23/06* (2013.01); *C08F 2/18* (2013.01); *C08F 4/022* (2013.01); *C08F 210/16* (2013.01); *C08L 23/0815* (2013.01); *C08L 2203/18* (2013.01); *C08L 2205/02* (2013.01); *C08L 2314/02* (2013.01)

(58) Field of Classification Search
None
See application file for complete search history.

(56) References Cited

U.S. PATENT DOCUMENTS

| | | | |
|---|---|---|---|
| 4,178,300 A | 12/1979 | Van Den Berg | |
| 6,294,682 B1 | 9/2001 | Rauleder et al. | |
| 2022/0363787 A1* | 11/2022 | Perez Valencia, Sr. | C08F 10/02 |

FOREIGN PATENT DOCUMENTS

| | | | | |
|---|---|---|---|---|
| EP | 2599828 A1 | 6/2013 | | |
| EP | 2785785 B1 | * | 2/2016 | C08L 23/06 |
| EP | 3647645 A1 | 5/2020 | | |
| WO | 2013087167 A2 | 6/2013 | | |
| WO | 2017009058 A1 | 1/2017 | | |
| WO | 2018234110 A1 | 12/2018 | | |
| WO | 2019197163 A1 | 10/2019 | | |
| WO | 2020088987 A1 | 5/2020 | | |

OTHER PUBLICATIONS

International Search Report for International Application No. PCT/EP2022/066078, International Filing Date Jun. 14, 2022, Date of Mailing Oct. 4, 2022, 3 pages.
Written Opinion for International Application No. PCT/EP2022/066078, International Filing Date Jun. 14, 2022, Date of Mailing Oct. 4, 2022, 6 pages.

* cited by examiner

*Primary Examiner* — Richard A. Huhn
(74) *Attorney, Agent, or Firm* — CANTOR COLBURN LLP

(57) ABSTRACT

An ethylene copolymer includes or consists of 55 to 80 wt % of an ethylene homopolymer component A and 20 to 45 wt % of an ethylene copolymer component B of ethylene and an olefin comonomer, wherein the component A has a melt flow index as measured according to ISO1133-1:2011 at 190° C., 1.2 kg of 80 to 400 dg/min and a density of at least 968 kg/m$^3$, and the ethylene copolymer has a melt flow index as measured according to ISO1133-1:2011 at 190° C., 5 kg of 0.05 to 0.3 dg/min, a density of 956 to 962 kg/m$^3$, a comonomer content of 0.03 to 0.30 mol %, a viscosity value η0.05 at a temperature of 190° C. and a shear rate of 0.05 rad/s of 200 to 1000 kPa·s and a viscosity value η300 at a temperature of 190° C. and a shear rate of 300 rad/s of 700 to 1500 Pa·s.

16 Claims, No Drawings

MULTIMODAL POLYETHYLENE

CROSS REFERENCE TO RELATED APPLICATIONS

This application is a National Stage application of PCT/EP2022/066078, filed Jun. 14, 2022, which claims the benefit of European Application No. 21179500.0, filed Jun. 15, 2021, both of which are incorporated by reference in their entirety herein.

BACKGROUND

The present invention relates to a multimodal, preferably bimodal, ethylene copolymer and use of such ethylene copolymer in articles such as pipes.

A multimodal ethylene copolymer is used in many application fields such as pipes.

EP3647645 discloses a polyethylene composition comprising a base resin having a density of from 950.0 kg/m$^3$ to 962.0 kg/m$^3$, wherein the polyethylene composition has a melt flow rate MFR21 (190° C., 21.16 kg) of from 1.0 to 9.0 g/10 min determined according to ISO 1133 and a viscosity at a constant shear stress of 747 Pa $\eta_{747}$ of from 3500 kPa·s to 20000 kPa·s. Further in the examples, pipes were made from the composition which were found to have a pressure resistance of about 2000 hours determined according to ISO1167-1:2006 at a hoop stress of 12.9 MPa at a temperature of 20° C.

WO2020088987 discloses a polyethylene composition comprising a base resin having a density of from 952.0 kg/m$^3$ to 960.0 kg/m$^3$, wherein the polyethylene composition has a melt flow rate MFR21 (190° C., 21.16 kg) of from 1.0 to 7.5 g/10 min, determined according to ISO 1133, a complex viscosity at a frequency of 0.05 rad/s η0.05 of from 750 kPa·s to 1900 kPa·s, determined according to ISO 6721-1 and ISO 6721-10, and a white spot rating of not more than 12.0, determined according to ISO 18553. Further in the examples, pipes were made from the composition which were found to have a pressure resistance of 6 to 70 hours determined according to ISO1167-1:2006 at a hoop stress of 7.0 MPa at a temperature of 80° C.

EP 2599828 A1 discloses a polyethylene composition comprising a base resin having a density of more than 950 kg/m$^3$ and equal to or less than 965 kg/m$^3$, determined according to ISO 1183-1:2004, and wherein the composition has a melt flow rate MFR5 (190° C., 5 kg) of equal to or less than 0.1 g/10 min, determined according to ISO 1133 and a polydispersity index PI within the range of equal to or higher than 3.0 Pa$^{-1}$ and equal to or less than 4.5 Pa$^{-1}$.

WO 2018/234110 A1 discloses a polymer composition comprising a base resin wherein the base resin includes a very high molecular weight polyethylene component, a low molecular weight polyethylene component having a weight average molecular weight lower than a weight average molecular weight of the very high molecular weight component and a high molecular weight component having a weight average molecular weight higher than the weight average molecular weight of the low molecular weight component, but lower than the weight average molecular weight of the very high molecular weight component. The composition has a complex viscosity at 0.05 rad/s $Eta_{0.05\ rad/s}$ of equal to or more than 800 kPa·s, a viscosity at a shear stress of 747 Pa (eta747) of equal to or less than 34000 kPas and a melt flow rate MFR5 of equal to or less than 0.17 g/10 min.

Resistance to pressure is important for many applications including pipes. Impact properties at low and high temperatures and processability are also important. Further, the surface appearance of the product such as pipes is also important. While known polyethylene is satisfactory for some applications, there is an ongoing need to provide an ethylene copolymer which has a combination of a high pressure resistance, a high impact strength and a high processability and which allows production of products with a good surface appearance.

SUMMARY

It is an objective of the present invention to provide an ethylene copolymer in which the above-mentioned and/or other needs are met.

Accordingly, the present invention provides an ethylene copolymer which comprises or consists of 55 to 80 wt % of an ethylene homopolymer component A and 20 to 45 wt % of an ethylene copolymer component B of ethylene and an olefin comonomer, wherein the component A has a melt flow index as measured according to ISO1133-1:2011 at 190° C. and 1.2 kg of 80 to 400 dg/min and a density of at least 968 kg/m$^3$, and wherein the ethylene copolymer has a melt flow index as measured according to ISO1133-1:2011 at 190° C. and 5 kg of 0.05 to 0.3 dg/min, a density of 956 to 962 kg/m$^3$, a comonomer content of 0.03 to 0.30 mol %, a viscosity value η0.05 at a temperature of 190° C. and a shear rate of 0.05 rad/s of 200 to 1000 kPa·s and a viscosity value η300 at a temperature of 190° C. and a shear rate of 300 rad/s of 700 to 1500 Pa·s.

DETAILED DESCRIPTION

It was surprisingly found that the ethylene copolymer according to the invention has a combination of a high pressure resistance, a high impact strength at low and high temperatures and a high processability and allows production of products with a good surface appearance.

The ethylene copolymer according to the invention is a multimodal ethylene copolymer. The ethylene copolymer according to the invention is preferably a bimodal ethylene copolymer, i.e. it consists of components A and B. However, the ethylene copolymer according to the invention may comprise one or more further ethylene polymer components.

Preferably, the total amount of components A and B with respect to the ethylene copolymer is at least 80 wt %, at least 90 wt %, at least 95 wt %, at least 98 wt %, at least 99 wt % or 100 wt %.

Ethylene Copolymer

By ethylene copolymer is meant a polymer the majority by weight of which derives from ethylene monomer units. The ethylene copolymer may be a copolymer of ethylene and a C3-C20 comonomer. The C3-C20 comonomer is preferably selected from the group consisting of C3-10 α-olefins such as propylene, 1-butene, 1-hexene and 1-octene. Most preferably, the ethylene copolymer is a copolymer of ethylene and 1-hexene.

The ethylene copolymer according to the invention has a comonomer content of 0.03 to 0.30 mol %, preferably 0.10 to 0.20 mol %.

The ethylene copolymer according to the invention has a melt flow index as measured according to ISO1133-1:2011 at 190° C. and 5 kg (herein sometimes referred as MI5) of 0.05 to 0.3 dg/min, preferably 0.08 to 0.27 dg/min, more preferably 0.10 to 0.24 dg/min.

Preferably, the ethylene copolymer according to the invention has a melt flow index as measured according to ISO1133-1:2011 at 190° C. and 21.6 kg (herein sometimes referred as MI21.6) of 5 to 15 dg/min, more preferably 8 to 14 dg/min.

The ethylene copolymer according to the invention has a density of 956 to 962 kg/m$^3$, preferably 958 to 960 kg/m$^3$.

The ethylene copolymer according to the invention has a viscosity value $\eta_{0.05}$ at a temperature of 190° C. and a shear rate of 0.05 rad/s of 200 to 1000 kPa·s, preferably 220 to 500 kPa·s. Such low viscosity at low shear rate results in a better surface appearance of the product made of the copolymer and a better homogeneity.

The ethylene copolymer according to the invention has a viscosity value $\eta_{300}$ at a temperature of 190° C. and a shear rate of 300 rad/s of 700 to 1500 Pa·s, preferably 800 to 1200 Pa·s. Such low viscosity at high shear rate gives a better processibility.

The viscosity values are determined according to the method described in the experimental section.

In some particularly preferred embodiments, the ethylene copolymer is a copolymer of ethylene and 1-hexene and has a melt flow index as measured according to ISO 1133-1: 2011 at 190° C. and 5 kg of 0.10 to 0.24 dg/min, a melt flow index as measured according to ISO1133-1:2011 at 190° C. and 21.6 kg of 8 to 14 dg/min, a density of 958 to 960 kg/m$^3$, a viscosity value $\eta_{300}$ at a temperature of 190° C. and a shear rate of 0.05 rad/s of 220 to 500 kPa·s and a viscosity value $\eta_{300}$ at a temperature of 190° C. and a shear rate of 300 rad/s of 800 to 1200 Pa·s.

Preferably, the ethylene copolymer according to the invention has a strain hardening as determined according to ISO18488 of 40 to 70 MPa, preferably 45 to 60 MPa.

Preferably, the ethylene copolymer according to the invention has a yield stress determined according to ISO527-1 at 23° C. of 20 to 32 MPa.

Preferably, the ethylene copolymer according to the invention has a Charpy impact strength as determined according to ISO 179-1/1eA at −30° C. of at least 20 kJ/m$^2$.

Preferably, the ethylene copolymer according to the invention has a Charpy impact strength as determined according to ISO 179-1/1eA at 0° C. of at least 20 kJ/m$^2$.

Preferably, the ethylene copolymer according to the invention has a Charpy impact strength as determined according to ISO 179-1/1eA at 23° C. of at least 20 kJ/m$^2$.

Ethylene Homopolymer Component A

Component A is an ethylene homopolymer.

Preferably, the ethylene polymer component A has a density of at least 968 kg/m$^3$, more preferably 968 to 975 kg/m$^3$.

Preferably, component A has a melt flow index as measured according to ISO1133-1:2011 at 190° C. and 1.2 kg of 80 to 400 dg/min, more preferably 100 to 200 dg/min.

The amount of component A with respect to the ethylene copolymer according to the invention is 55 to 80 wt %, preferably 58 to 70 wt %, more preferably 60 to 65 wt %.

Ethylene Copolymer Component B

Component B is a copolymer of ethylene and a C3-C20 comonomer. The C3-C20 comonomer is preferably selected from the group consisting of C3-10 α-olefins such as propylene, 1-butene, 1-hexene and 1-octene. Most preferably, component B is a copolymer of ethylene and 1-hexene.

The amount of component B with respect to the ethylene copolymer according to the invention is 20 to 45 wt %, preferably 30 to 42 wt %, more preferably 35 to 40 wt %.

Process for Preparation of Ethylene Copolymer

The ethylene copolymer according to the invention may be prepared by a process comprising melt-mixing or solution blending the components A and B and optional further ethylene polymer component(s) made in different reactors to obtain the ethylene copolymer. The melt-mixing or solution blending may be carried out in any conventional blending apparatus. The components A and B and optional further ethylene polymer component(s) to be melt-mixed or solution blended may be produced by any known process.

Alternatively, the ethylene copolymer according to the invention may be prepared by a process comprising polymerizing component A and subsequently polymerizing component B in the presence of component A. Accordingly, the invention provides a process for the preparation of the ethylene copolymer according to the invention, wherein the process comprises a sequential polymerization process comprising at least two reactors connected in series, wherein said process comprises the steps of preparing component A in a first reactor using the first set of conditions, transferring said component A and optionally unreacted monomers of the first reactor to a second reactor, feeding monomers to said second reactor and preparing component B in said second reactor in the presence of said component A.

In such a case, the properties of the fractions produced in the second reactor can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13. The properties of the fractions produced in a higher stage of the multistage process may also be calculated K. B. McAuley, J. F. McGregor, AIChE Journal, vol. 37, No. 6, 825-835, June 1991.

Thus, although not directly measurable on the multistage process products, the properties of the fractions produced in higher stages of such a multistage process can be determined by applying either or both of the above methods. The skilled person will be able to select the appropriate method.

When transferring component A of the first reactor to the second reactor, the unreacted monomers may also be transferred to the second reactor or the unreacted monomers may be partially or totally removed in an operation unit in-between the reactors, such as a flashing step Catalyst Each of the ethylene polymer components A and B and the optional further ethylene polymer component(s) may be produced in the presence of known catalyst systems such as a Ziegler Natta catalyst system or a mηllocene catalyst system, preferably a Ziegler Natta catalyst system. The polymerization can be carried out in the presence of an anti-static agent or anti fouling agent in an amount ranging between for example 1 and 500 ppm related to the total amount of reactor contents.

Preferably, the catalyst system comprises (I) the solid reaction product obtained by reaction of:

a) a hydrocarbon solution containing 1) an organic oxygen containing magnesium compound or a halogen containing magnesium compound and 2) an organic oxygen containing titanium compound and b) an aluminium halogenide having the formula $AlR_nX_{3-n}$ in which R is a hydrocarbon moiety containing 1-10 carbon atoms, X is halogen and $0<n<3$ and (II) an aluminium compound having the formula $AlR_3$ in which R is a hydrocarbon moiety containing 1-10 carbon atoms.

During the reaction of the hydrocarbon solution comprising the organic oxygen containing magnesium compound and the organic oxygen containing titanium compound with component (I b) a solid catalyst precursor precipitates and after the precipitation reaction the resulting mixture is heated to finish the reaction.

The aluminium compound (II) is dosed prior to or during the polymerization and may be referred to as a cocatalyst.

The polymerisation process may be a slurry polymerisation process.

Preferably, the diluent in the slurry polymerisation process is a diluent consisting of aliphatic hydrocarbon compounds that displays an atmospheric boiling temperature of at least 35° C., more preferred above 55° C. Suitable diluent is hexane and heptane. The preferred diluent is hexane.

Suitable organic oxygen containing magnesium compounds include for example magnesium alkoxides such as magnesium methylate, magnesium ethylate and magnesium isopropylate and alkylalkoxides such as magnesium ethylethylate and so called carbonized magnesiumalkoxide such as magnesium ethyl carbonate. Preferably, the organic oxygen containing magnesium compound is a magnesium alkoxide. Preferably the magnesium alkoxide is magnesium ethoxide $Mg(OC_2H_5)_2$.

Suitable halogen containing magnesium compounds include for example magnesium dihalides and magnesium dihalide complexes wherein the halide is preferably chlorine.

Preferably the hydrocarbon solution comprises an organic oxygen containing magnesium compound as (I) (a) (1).

Suitable organic oxygen containing titanium compound may be represented by the general formula $[TiO_x(OR)_{4-2x}]_n$ in which R represents an organic moiety, x ranges between 0 and 1 and n ranges between 1 and 6.

Suitable examples of organic oxygen containing titanium compounds include alkoxides, phenoxides, oxyalkoxides, condensed alkoxides, carboxylates and enolates. Preferably the organic oxygen containing titanium compounds is a titanium alkoxide. Suitable alkoxides include for example Ti $(OC_2H_5)_4$, Ti $(OC_3H_7)_4$, $TiOC_4H_9)_4$ and $Ti(OC_8H_{17})_4$. Preferably the organic oxygen containing titanium compound is Ti $(OC_4H_9)_4$.

Preferably the aluminium halogenide is a compound having the formula $AlR_nX_{3-n}$ in which R is a hydrocarbon moiety containing 1-10 carbon atoms, X is halogen and $0.5<n<2$. Suitable examples of the aluminium halogenide in (I) b having the formula $AlR_nX_{3-n}$ include ethyl aluminium dibromide, ethyl aluminium dichloride, propyl aluminium dichloride, n-butyl aluminium dichloride, iso butyl aluminium dichloride, diethyl aluminium chloride, diisobutyl aluminium chloride. Preferably X is Cl. Preferably the organo aluminium halogenide in (I) b) is an organo aluminium chloride, more preferably the organo aluminium halogenide in (I) b) is chosen from ethyl aluminium dichloride, diethyl aluminium dichloride, isobutyl aluminium dichloride, diisobutyl aluminium chloride or mixtures thereof.

Generally the molar ratio of Al from I b): Ti from I a) 2 ranges between 3:1 and 16:1. According to a preferred embodiment of the invention the molar ratio of Al from I b): Ti from I a) 2 ranges between 6:1 and 10:1.

Suitable examples 1 of the cocatalyst of the formula $AlR_3$ include tri ethyl aluminium, tri isobutyl aluminium, tri-n-hexyl aluminium and tri octyl aluminium. Preferably the aluminium compound in (II) of the formula $AlR_3$ is tri ethyl aluminium or tri isobutyl aluminium.

The hydrocarbon solution of organic oxygen containing magnesium compound and organic oxygen containing titanium compound can be prepared according to procedures as disclosed for example in U.S. Pat. No. 4,178,300 and EP0876318. The solutions are in general clear liquids. In case there are any solid particles, these can be removed via filtration prior to the use of the solution in the catalyst synthesis.

Generally the molar ratio of magnesium:titanium is lower than 3:1 and preferably the molar ratio magnesium:titanium ranges between 0, 2:1 and 3:1.

Generally the molar ratio of aluminium from (II):titanium from (a) ranges between 1:1 and 300:1 and preferably the molar ratio of aluminium from (II):titanium from (a) ranges between 3:1 and 100:1.

The catalyst may be obtained by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and the organo aluminium halogenide having the formula $AlR_nX_{3-n}$ Optionally an electron donor can be added either during the preparation of the solid catalytic complex (at the same time as the subsequent step or in an additional step) or at the polymerization stage. The addition of an electron donor is for example disclosed in WO2013087167.

Generally, the aluminium halogenide having the formula $AlR_nX_{3-n}$ is used as a solution in a hydrocarbon. Any hydrocarbon that does not react with the organo aluminium halogenide is suitable to be applied as the hydrocarbon.

The sequence of the addition can be either adding the hydrocarbon solution containing the organic oxygen containing magnesium compound and organic oxygen containing titanium compound to the compound having the formula $AlR_nX_{3-n}$ or the reversed.

The temperature for this reaction can be any temperature below the boiling point of the used hydrocarbon. Generally the duration of the addition is preferably shorter than 1 hour.

In the reaction of the hydrocarbon solution of the organic oxygen containing magnesium compound and the organic oxygen containing titanium compound with the organo aluminium halogenide of formula $AlR_nX_{3-n}$, the solid catalyst precursor precipitates. After the precipitation reaction the resulting mixture is heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

Further Aspects

The present invention further relates to a composition comprising the ethylene copolymer according to the invention. The composition may consist of the ethylene copolymer according to the invention and additives such as pigments, nucleating agents, antistatic agents, fillers, antioxidants etc. Typically, the amount of the ethylene copolymer is 90 to 99.9 wt %, for example at least 95 wt %, at least 98 wt % or at least 99 wt % with respect to the composition. Typically, the amount of the additives is 0.1 to 10 wt %, for example at most 5 wt %, at most 2 wt % or at most 1 wt % with respect to the composition.

The density of the composition according to the invention may be substantially the same as the density of the ethylene copolymer according to the invention. When the composition comprises pigments and/or fillers e.g. carbon black, the density of the ethylene copolymer composition may be from 956 to 974 kg/m$^3$, for example 958 to 972 kg/m$^3$.

The present invention further relates to an article comprising the ethylene copolymer according to the invention or the composition according to the invention. Preferably, the article is an extruded article such a pipe.

Preferably, the pipe according to the invention has a pressure resistance of at least 1000 hours determined according to ISO 1167-1:2006 using end caps of type A at a hoop stress of 13.0 MPa at a temperature of 20° C. and/or at least 5000 hours determined according to ISO 1167-1:2006 using end caps of type A at a hoop stress of 12.8 MPa at a temperature of 20° C.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Catalyst Preparation

Catalyst 1

100 grams of granular $Mg(OC_2H_5)_2$ and 150 millilitres of $Ti(OC_4H_9)_4$ were brought in a 2 litre round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

In a 1.0 liters glass reactor, equipped with baffles, reflux condenser and stirrer, 286 ml hexanes and 170 ml of the complex from obtained above were dosed. The stirrer was set at 1400 rpm. In a separate flask, 75 ml of 50% ethyl aluminium dichloride (EADC) solution was added to 43 ml of hexanes. The resulting EADC solution was dosed into the reactor in 15 minutes using a peristaltic pump. Subsequently, the mixture was refluxed for 2 hours. After cooling down to ambient temperature, the obtained red/brown suspension was transferred to a glass P4 filter and the solids were separated. The solids were washed 4 times using 500 ml of hexanes. The solids were taken up in 0.3 L of hexanes and the resulting slurry was stored under nitrogen. The solid content was 30 g/l Catalyst Analysis Results:

Ti 9.7 wt % Mg 10.4 wt % Al 4.6 wt % Cl 49 wt % OEt 9.0 wt % and OBu 12 wt %

Catalyst 2 (WO2017/009058, p. 9, I.13-p. 10, I.4)

Preparation of a hydrocarbon solution comprising the organic oxygen containing magnesium compound and the organic oxygen containing titanium compound 100 grams of granular $Mg(OC_2H_5)_2$ and 150 millilitres of $Ti(OC_4H_9)_4$ were brought in a 2 litre round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Preparation of the Catalyst

In a 0.8 liters glass reactor, equipped with baffles, reflux condenser and stirrer, 424 ml hexanes and 160 ml of the complex from Example I were dosed. The stirrer was set at 1200 RPM. In a separate flask, 100 ml of 50% ethyl aluminum dichloride (EADC) solution was added to 55 mL of hexanes. The resulting EADC solution was dosed into the reactor in 15 minutes using a peristaltic pump. Subsequently, the mixture was refluxed for 2 hours. After cooling down to ambient temperature, the obtained red/brown suspension was transferred to a glass P4 filter and the solids were separated. The solids were washed 3 times using 500 ml of hexanes. The solids were taken up in 0.5 L of hexanes and the resulting slurry was stored under nitrogen. The solid content was 64 g ml$^{-1}$ Catalyst Analysis Results:

Ti 10.8 wt %; Mg 1 1.2 wt %; Al 5.0 wt %; Cl 65 wt %; OEt 3.2 wt % and OBu 2.6 wt %.

Preparations of Ethylene Copolymer

Inventive Example 1

A Continuous Stirred Tank Reactor (CSTR) reactor with 20 liters total volume and 15 liters of operating volume was operated at 88° C. and 5.0 barg total pressure. For producing a first polymer fraction, 750 g/h of ethylene and 1.08 g/h of hydrogen were added to the polymerization reactor, along with 2869 g/h of hexanes mixtures. In addition, Catalyst 1 prepared as above was introduced into the reactor at the rate needed to keep the total pressure of the reactor constant. No additional comonomer was introduced into the reactor. The conditions in the reactor are shown in table 1.

The polymer slurry was withdrawn from the reactor and transferred to an adiabatic flash vessel were pressure was manipulated in order to get the desired H2/C2 gas phase ratio in the second reactor. After this flashing step, the polymer slurry was withdrawn from the flash vessel and transferred to a second CSTR reactor with same total and operating volumes as the first CSTR reactor.

The second CSTR reactor was operated at 67° C. and 4.9 barg total pressure. Into the reactor were introduced ethylene at a rate of 495 g/h, hexanes mixtures at a rate of 6000 g/h, 1-hexene at a rate of 260 g/h and nitrogen in order to keep the total pressure constant at 4.9 barg. The conditions in the second CSTR reactor are shown in table 1.

The slurry withdrawn from the second CSTR reactor was transferred into a centrifugal decanter where the polymer and hexane were separated.

The resulting polymer was then dried under vacuum at 60° C. overnight. The dry polymer was stabilized with 3000 ppm of a mixture of Calcium Stearate, Irgafos 168 and Irganox 1010 in weight ratio 50/37.5/12.5 respectively and then extruded into pellets in a Coperion NT co-rotating twin screw extruder system, so that the extruder throughput was 25.9 kg/h.

Inventive Example 2

Inventive example 2 was identical to inventive example 1 except the polymerization conditions and feeds were as shown in Table 1.

Comparative Experiment 3

Comparative experiment 3 was identical to inventive example 1 except:

- Catalyst 2 was used instead of Catalyst 1
- The polymerization conditions and feeds were as shown in Table 1
- During the pelletization of the polymer powder, neat carbon black was added in addition to the additives added in Inventive example 1.

TABLE 1

| | IE1 | IE2 | CE3 |
|---|---|---|---|
| First CSTR reactor | | | |
| Temperature (° C.) | 88 | 88 | 85 |
| Pressure (barg) | 5 | 6.5 | 8.7 |
| Hexane feed (g/h) | 2869 | 2869 | 2869 |
| Ethylene feed (g/h) | 750 | 750 | 350 |
| Hydrogen feed (g/h) | 1.08 | 0.67 | 0.78 |
| 1-Hexene feed (g/h) | 0 | 0 | 0 |
| Polymer split (wt %) | 64.3 | 60.6 | 50.2 |
| Ethylene gas phase (mol %) | 17.9 | 14.5 | 14.9 |
| Hydrogen gas phase (mol %) | 58.2 | 46 | 62.5 |
| Nitrogen gas phase (mol %) | 12.2 | 27.8 | 15.6 |
| Ethane gas phase (mol %) | 3.1 | 2.35 | 2.65 |
| H2/C2 gas phase ratio (mol/mol) | 3.25 | 3.17 | 4.21 |
| MI1.2 (g/10 min) | 120.5 | 126.8 | 53.3 |
| Density (kg/m3) | >972 | >972 | >972 |
| Second CSTR reactor | | | |
| Temperature (° C.) | 67 | 70 | 78 |
| Pressure (barg) | 4.9 | 4.9 | 4.8 |
| Hexane feed (g/h) | 6000 | 6000 | 6000 |
| Ethylene feed (g/h) | 495 | 570 | 406 |
| Hydrogen feed (g/h) | 0 | 0 | 0.017 |
| 1-Hexene feed (g/h) | 260 | 200 | 400 |
| Polymer split (wt %) | 35.7 | 39.4 | 49.8 |
| Ethylene gas phase (mol %) | 35.1 | 40.2 | 43 |
| Hydrogen gas phase (mol %) | 0.45 | 0.46 | 3.34 |
| Nitrogen gas phase (mol %) | 57.2 | 53.2 | 42.6 |
| Ethane gas phase (mol %) | 0.43 | 0.37 | 0.95 |
| 1-Hexene gas phase (mol %) | 0.61 | 0.48 | 1.3 |
| H2/C2 gas phase ratio (mol/mol) | 0.013 | 0.011 | 0.078 |
| 1-Hexene/C2 gas phase ratio (mol/mol) | 0.017 | 0.012 | 0.03 |

Various properties of the pellets of the ethylene-1-hexene copolymers of IE1, IE2 and CE3 were measured as in Table 2. Further, the properties of pellets made of the following ethylene copolymers were measured and the results are shown in Table 2.

- CE4: A6060 00900, a commercial material for PE100 pipe applications available from SABIC (ethylene-1-butene copolymer).
- CE5: HE3490LS, a commercial material for PE100 pipe applications available from *Borealis* (ethylene-1-butene copolymer).
- CE6: Eltex TUB 124 N6000, a commercial material for PE100 pipe applications available from Ineos (ethylene-1-hexene copolymer).

TABLE 2

| | IE1 | IE2 | CE3 | CE4 | CE5 | CE6 |
|---|---|---|---|---|---|---|
| MI5 (g/10 min) | 0.16 | 0.13 | 0.32 | 0.27 | 0.26 | 0.3 |
| MI21.6 (g/10 min) | 13.7 | 10.2 | | | 8.2 | |
| Density (kg/m$^3$) | 959.1 | 958.1 | 948.4* | 949.5 | around 950** | around 952*** |
| Comonomer | 1-hexene | 1-hexene | 1-hexene | 1-butene | 1-butene | 1-hexene |
| Comonomer content (mol %) | 0.17 | 0.13 | | | | |
| η0.05 (kPa s) | 276 | 297 | 103 | 134 | 149 | |
| η300 (Pa s) | 865 | 1012 | 1052 | 1031 | 1116 | |
| Mn (kDa) | 8 | 8 | | | | |
| Mw (kDa) | 360 | 340 | | | | |
| Mz (kDa) | 2300 | 2100 | | | | |
| Yield Stress (MPa) | 30 | 29.2 | | 24 | 25.5 | 25 |
| SH (MPa) | 49.4 | 50.9 | 67.2 | 43.8 | 44.7 | |
| Charpy −30 C. (kJ/m$^2$) | 21.4 | 24.2 | 9.3 | 8.4 | 9 | |

TABLE 2-continued

| | IE1 | IE2 | CE3 | CE4 | CE5 | CE6 |
|---|---|---|---|---|---|---|
| Charpy 0 C. (kJ/m$^2$) | 24 | 27 | | | | |
| Charpy 23 C. (kJ/m$^2$) | 29.5 | 33.8 | | | | |

*For CE3, the density was measured on pellets comprising the same additives as the pellets of IE1 and IE2 (without the addition of carbon black)
**For CE5, the density was measured on pellets made with the addition of carbon black to be 961.8 kg/m$^3$. The pellet density without carbon black can be estimated to be around 950 kg/m$^3$.
***For CE6, the density was measured on pellets made with the addition of blue pigment to be 953 kg/m$^3$. The pellet density without the blue pigment can be estimated to be around 952 kg/m$^3$.

It can be understood that the ethylene copolymer according to the invention (IE1 and IE2) has a combination of a good processability due to the low viscosity during pipe extrusion (η300), a better surface appearance and a better homogeneity due to low η0.05 and a very high impact strength at low temperature.

In comparison, CE3, CE4 and CE5 have a low impact strength at low temperature.

It is further noted that the ethylene composition according to the invention (IE1 and IE2) has a much lower viscosity than the examples of EP3647645 (η0.05 of 1039 to 1424 kPas and η300 of 1190 to 1753 Pas), thus offering better processability, surface appearance and homogenization.

It is further noted that the ethylene composition according to the invention (IE1 and IE2) has a much lower viscosity than the examples of WO2020088987 (η0.05 of 935 to 1288 kPas and η300 of 1297 to 1476 Pas), thus offering better processability, surface appearance and homogenization.

Further, the polyethylene composition of IE1 and CE3-CE6 were extruded to 32 mm SDR 11 pipes in a Reifenhauser S50×30D pipe extruder. Extrusion conditions are presented in Table 3.

TABLE 3

| | |
|---|---|
| Screw speed (rpm) | 60 |
| Throughput (kg/h) | 50-60 |
| Pipe speed (m/min) | 3.5 |
| Barrel zone 1 (C) | 75 |
| Barrel zone 2 (C) | 200 |
| Barrel zone 3 (C) | 220 |
| Barrel zone 4 (C) | 225 |
| Barrel zone 5 (C) | 230 |
| Barrel zone 6 (C) | 230 |
| Barrel zone 7 (C) | 235 |
| Barrel zone 8 (C) | 235 |
| Barrel zone 9 (C) | 240 |

The pipes were subjected to pressure tests according to ISO 1167-1:2006 using end caps of type A. The results of the pressure tests are shown in Table 4.

TABLE 4

| | IE1 | CE3 | CE4 | CE5 | CE6 |
|---|---|---|---|---|---|
| 13 MPa, 20 C. (h) | 1046 | | | | |
| 13 MPa, 20 C. (h) | 1300 | | | | |
| 13 MPa, 20 C. (h) | 1834 | | | | |
| 12.8 MPa, 20 C. (h) | 5109 | | | | |
| 12.8 MPa, 20 C. (h) | >5270 | | | | |
| 12.8 MPa, 20 C. (h) | >5270 | | | | |
| 12.6 MPa, 20 C. (h) | | | 34 | | |
| 12.6 MPa, 20 C. (h) | | | 67 | | |
| 12.6 MPa, 20 C. (h) | | | 47 | | |
| 12.4 MPa, 20 C. (h) | | 83 | | 202 | |
| 12.4 MPa, 20 C. (h) | | 109 | | 328 | |
| 12.4 MPa, 20 C. (h) | | 84 | | 889 | |

TABLE 4-continued

| | IE1 | CE3 | CE4 | CE5 | CE6 |
|---|---|---|---|---|---|
| 12.0 MPa, 20 C. (h) | | 201 | | | 315 |
| 12.0 MPa, 20 C. (h) | | 210 | | | 410 |
| 12.0 MPa, 20 C. (h) | | 300 | | | 266 |

It can be understood that the pipe made of the polyethylene composition according to the invention (IE1) has a much higher pressure resistance than CE3, CE4, CE5 and CE6.

Measurements of properties mentioned herein were performed as follows.

MFI

MFI was measured according to ISO 1133-1:2011 under a load of 1.2 kg (MI1.2), 5 kg (MI5) or 21.6 kg (MI21.6) at 190° C.

Density

Density of polymer powder samples was measured by preparing polymer test plaques of 40×40×1.6 mm, following ISO 17855-2 in a Fontyne press model TP200. The compression cycle has a temperature set at 180 C, with 10 minutes of contact pressure. Cooling is performed with an initial time of 30 seconds without pressure increase, followed by pressure increase until 200 kN and maintaining the pressure level during the time needed for the sample to reach 23 C at a cooling rate of 15±2° C./min. Mass of the test plaque is determined in air (Analytical Balance XS104 Mettler Toledo). Subsequently, the test plaque is immersed in 4 liters of water at 100° C. (Automatic Densimeter D-H100 from Toyo Seiki equipped with a thermostatic bath MX7LR-20 from WMR) for 10 minutes after which the heat is turn off and the sample is cooled down to room temperature. The density is determined as follows:

$$\rho_s = \frac{m_{s,air} \cdot \rho_{water}}{m_{s,air} - (m_{s+nc,water} - m_{nc,water})} + 0.0027$$

where:

$\rho_s$=Density of the test plaque (g/cm$^3$)

$m_{s,air}$=Mass of the test plaque in air (g)

$\rho_{water}$=Density of demineralized water (g/cm$^3$) at test temperature (23° C.)

$m_{s+nc,water}$=Mass of the test plaque and sinker in water (g)

$m_{nc,water}$=Mass of the sinker clamp in water (g)

Note: since density of polyethylene is lower than water, a sinker is used to keep the test plaque immersed.

Density of polymer pellet samples was measured by following ISO 1183 A with the immersion method.

Comonomer Content

Samples were dissolved at 125° C. in $C_2D_2Cl_4$ containing DBPC (2,6-di-tert-butyl-paracresol) as stabilizer. The $^{13}C$ NMR spectra were recorded on a Bruker Avance500 NMR spectrometer equipped with a 10 mm cryogenically-cooled probe head operating at 125° C. Data were processed using Bruker Topspin 3.6.

Dynamic Mechanical Properties (Viscosity η):

The viscosity values at each shear rate are calculated by fitting flow curves generated by oscillatory reometer according to ISO 6721-10 between 0.01 and 100 rad/s at 190 C on parallel plates with 25 mm diameter and 1.2 mm gap with a modified Carreau-Yasuda model, which is represented by the following equation:

$$\eta = \eta_0 \cdot [1 + (\lambda \cdot \gamma)^a]^{\frac{n-1}{a}} \qquad [1]$$

where

η is the viscosity in Pa·s $\eta_0$ is the zero shear viscosity (Pa·s)

a is the rheological breadth parameter n is the power law constant, set to 0 in the present case (defines the slope of the high shear rate region)

γ is the shear rate (1/s)

λ is the relaxation time (s)

$\eta_{300}$ is the viscosity value in Pa·s at 190° C. and a shear rate of 300 rad/s as calculated by equation [1] previously fitted to the flow curve data generated by oscillatory rheometry between 0.01 and 100 rad/s at 190 C according to ISO 6721-10 on parallel plates with 25 mm diameter and 1.2 mm gap.

$\eta_{0.05}$ is the viscosity value in Pa·s at 190° C. and a shear rate of 0.05 rad/s as calculated by equation [1] previously fitted to the flow curve data generated by oscillatory rheometry between 0.01 and 100 rad/s at 190 C according to ISO 6721-10 on parallel plates with 25 mm diameter and 1.2 mm gap.

To facilitate model fitting, the power law constant is held at a constant value, in this case zero. Details of the significance and interpretation of the Carreau-Yasuda model and derived parameters may be found in: C. A. Hieber and H. H. Chiang, Rheol Acta, 28, 321 (1989); C. A. Hieber and H. H. Chiang, Polym. Eng. Sci., 32, 931 (1992); and R. B. Bird, R. C. Armstrong and O. Hasseger, Dynamics of Polymeric Liquids, Volume 1, Fluid Mechanics, 2nd Edition, John Wiley & Sons (1987), each of which is incorporated by reference herein in its entirety.

Molecular Weight Distribution (MWD) and Moments of the MWD

Mw, Mn and Mz were measured in accordance with ASTM D6474-12 (Standard Test Method for Determining molecular weight distribution and molecular weight Averages of Polyolefins by High Temperature Gel Permeation Chromatography). Mw stands for the weight averaged molecular weight and Mn stands for the number averaged molecular weight. Mz stands for the z-averaged molecular weight.

A high-temperature chromatograph Polymer Char GPC-IR system equipped with IR5 MCT detector and Polymer Char viscometer (Polymer Char S.A., Spain) was used at 160° C. to determine the MWD and SCB as function of molecular weight. Three columns of Polymer Laboratories 13 μm PLgel Olexis, 300×7.5 mm, were used in series for GPC separation. 1,2,4-trichlorobenzene stabilized with 1 g/L butylhydroxytoluene (also known as 2,6-di-tert-butyl-4-methylphenol or BHT) was used as eluent at a flow rate of 1 mL/min. Sample concentration was around 0.7 mg/mL and injection volume was 300 μL. The molar mass was determined based on the Universal GPC-principle using a calibration made with PE narrow and broad standards (in the range of 0.5-2800 kg/mol, Mw/Mn—4 to 15) in combination with known Mark Houwink constants of PE-calibrant (alfa=0.725 and log K=−3.721).

Yield Stress:

Yield stress is measured following ISO527-1 at 1 mm/min for modulus and at 50 mm/min for the tensile test, on bars of type 1B, with average results from 5 specimens at 23° C.

Strain Hardening Modulus

Strain hardening was determined according to ISO18488.

Impact Resistance

Impact resistance was measured by Charpy method following ISO 179-1/1eA, non instrumented test at −30° C., 0° C. and 23° C. on specimens with dimensions 80×10×4 mm and a notch of type A. The result is the average of 5 specimens being tested. The direction of the blow is edgewise. Specimens are prepared by compression molding following ISO17855-2, at a compression molding temperature of 180° C., with a compression molding cooling rate of 15° C./min and a plaque thickness of 4 mm. Final specimens are prepared by machining from the compression molded plaque.

Internal Pressure Tests

IPT tests were performed on pipes of 32 mm SDR11 size following ISO 1167-1:2006 using end caps of type A at 20° C.

The invention claimed is:

1. An ethylene copolymer which comprises 55 to 80 wt % of an ethylene homopolymer component A and 20 to 45 wt % of an ethylene copolymer component B of ethylene and an olefin comonomer, wherein the component A has a melt flow index as measured according to ISO1133-1:2011 at 190° C. and 1.2 kg of 80 to 400 dg/min and a density of at least 968 kg/m$^3$, and wherein the ethylene copolymer has a melt flow index as measured according to ISO1133-1:2011 at 190° C. and 5 kg of 0.05 to 0.3 dg/min, a density of 956 to 962 kg/m$^3$, a comonomer content of 0.03 to 0.30 mol %, a viscosity value η0.05 at a temperature of 190° C. and a shear rate of 0.05 rad/s of 200 to 1000 kPa·s and a viscosity value η300 at a temperature of 190° C. and a shear rate of 300 rad/s of 700 to 1500 Pa·s.

2. The ethylene copolymer according to claim 1, wherein the ethylene copolymer is an ethylene copolymer of ethylene and a C3-C20 comonomer.

3. The ethylene copolymer according to claim 1, wherein the ethylene copolymer is an ethylene copolymer of ethylene and 1-hexene.

4. The ethylene copolymer according to claim 1, wherein the ethylene copolymer has a melt flow index as measured according to ISO1133-1:2011 at 190° C. and 21.6 kg of 5 to 15 dg/min.

5. The ethylene copolymer according to claim 1, wherein the ethylene copolymer has a density of 958 to 960 kg/m$^3$.

6. The ethylene copolymer according to claim 1, wherein the ethylene copolymer has a comonomer content of 0.10 to 0.20 mol %.

7. The ethylene copolymer according to claim 1, wherein the ethylene copolymer has a Charpy impact strength as determined according to ISO 179-1/1eA at −30° C. of at least 20 KJ/m$^2$.

8. The ethylene copolymer according to claim 1, wherein the total amount of components A and B with respect to the ethylene copolymer is at least 80 wt %.

9. A process for the preparation of the ethylene copolymer according to claim 1, comprising melt-mixing or solution blending the components A and B, wherein each of components A and B is prepared by a slurry polymerisation process in the presence of a Ziegler Natta catalyst system.

10. A process for the preparation of the ethylene copolymer according to claim 1, comprising a multi-step slurry polymerisation process using cascaded reactors in the presence of a Ziegler Natta catalyst system.

11. The process according to claim 9, wherein the catalyst system comprises (I) the solid reaction product obtained by reaction of:

a) a hydrocarbon solution containing

1) An organic oxygen containing magnesium compound or a halogen containing magnesium compound and 2) An organic oxygen containing titanium compound and b) an aluminium halogenide having the formula $AlR_nX_{3-n}$ in which R is a hydrocarbon moiety containing 1-10 carbon atoms, X is halogen and $0<n<3$ and (II) an aluminium compound having the formula $AlR_3$ in which R is a hydrocarbon moiety containing 1-10 carbon atoms.

12. A composition comprising the ethylene copolymer according to claim 1 and additives.

13. An article comprising the composition according to claim 12.

14. An article comprising the ethylene copolymer according to claim 1.

15. The article according to claim 14, wherein the article is a pipe.

16. The pipe according to claim 15, wherein the pipe has a pressure resistance of at least 1000 hours determined according to ISO 1167-1:2006 using end caps of type A at a hoop stress of 13.0 MPa at a temperature of 20° C. and/or at least 5000 hours determined according to ISO 1167-1:2006 using end caps of type A at a hoop stress of 12.8 MPa at a temperature of 20° C.

* * * * *